(12) United States Patent
Horsman et al.

(10) Patent No.: US 9,130,913 B2
(45) Date of Patent: Sep. 8, 2015

(54) AUTOMATIC DETERMINING OF FILE TRANSFER MODE

(71) Applicant: International Business Machines Corporation, Armonk, NY (US)

(72) Inventors: Steven J. Horsman, Winchester (GB); Colin C. Stone, Winchester (GB); Joseph R. Winchester, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/742,957

(22) Filed: Jan. 16, 2013

(65) Prior Publication Data

US 2013/0191457 A1    Jul. 25, 2013

(30) Foreign Application Priority Data

Jan. 24, 2012    (GB) .................................. 1201132.6

(51) Int. Cl.
     *G06F 15/16*      (2006.01)
     *H04L 29/08*      (2006.01)

(52) U.S. Cl.
     CPC ...................................... *H04L 67/06* (2013.01)

(58) Field of Classification Search
     None
     See application file for complete search history.

(56) References Cited

U.S. PATENT DOCUMENTS

| 5,615,379 | A | * | 3/1997 | Wehle | 717/110 |
| 5,778,359 | A | * | 7/1998 | Stent | 712/300 |
| 5,930,478 | A | | 7/1999 | Mebane | |
| 6,049,869 | A | * | 4/2000 | Pickhardt et al. | 712/300 |
| 6,092,100 | A | * | 7/2000 | Berstis et al. | 709/203 |
| 6,701,320 | B1 | * | 3/2004 | Marple | 707/758 |
| 7,103,532 | B1 | | 9/2006 | Murray et al. | |
| 7,359,990 | B2 | | 4/2008 | Munir et al. | |
| 7,835,361 | B1 | | 11/2010 | Dubrovsky et al. | |
| 8,738,669 | B1 | * | 5/2014 | Hsu et al. | 707/822 |
| 2003/0033334 | A1 | * | 2/2003 | Banerjee et al. | 707/542 |
| 2003/0208564 | A1 | | 11/2003 | Miyake et al. | |
| 2003/0225793 | A1 | | 12/2003 | Chakraborty | |
| 2004/0003013 | A1 | | 1/2004 | Coulthard et al. | |
| 2005/0273708 | A1 | | 12/2005 | Motyka et al. | |

(Continued)

OTHER PUBLICATIONS

UK International Examination and Search Report, Application No. GB1201132.6, May 21, 2012, 3 pages.
"iSeries FTP", IBM Corporation, http://publib.boulder.ibm.com/iseries/v5r2/ic2924/info/rzaiq/rzaiq.pdf, 1998, 2002, 156 pages.

(Continued)

*Primary Examiner* — Wing F Chan
*Assistant Examiner* — Padma Mundur
(74) *Attorney, Agent, or Firm* — Francis Lammes; Stephen J. Walder, Jr.; William J. Stock

(57) ABSTRACT

A mechanism is provided for automatic determining of file transfer mode. A locale or an operating system of a client in a file transfer is determined. At least part of a transfer file is downloaded in a first text format to obtain first resulting bytes. The first resulting bytes are analyzed to determine whether the first resulting bytes match a character set of the locale or the operating system of the client above a first predetermined threshold. A determination is made as to whether the first text format should be used for downloading the transfer file based on whether the first resulting bytes match the character set of the locale or the operating system of the client above the first predetermined threshold. Responsive to the first resulting bytes matching above the first predetermined threshold, the transfer file is downloaded in the identified first text format.

15 Claims, 4 Drawing Sheets

(56) References Cited

U.S. PATENT DOCUMENTS

2009/0254891 A1    10/2009  Cui et al.
2012/0134589 A1*   5/2012   Reddy .......................... 382/182

OTHER PUBLICATIONS

"Uploading Files to Your Server", http://www.bluereef.net/support/serverbasics/upload.html, retrieved Nov. 16, 2011, 4 pages.

* cited by examiner

AUTOMATIC DETERMINING OF FILE TRANSFER MODE

BACKGROUND

This invention relates to the field of network file transfer. In particular, the invention relates to automatic determining of file transfer mode.

File Transfer Protocol (FTP) is a standard network protocol used to transfer files from one host to another host over a Transmission Control Protocol (TCP) based network, such as the Internet. FTP is built on a client-server architecture and utilizes separate control and data connections between the client and server.

FTP clients allow transfer of data in two modes—binary and text. The binary mode transfers bytes in their raw form. The text mode assumes the data contains text characters and performs any required conversion during puts and gets as specified in the configuration of the FTP server.

An example of this is used by the operating system z/OS (z/OS is a trademark of International Business Machines Corporation), where text data is typically stored on disk using the Extended Binary Coded Decimal Interchange Code (EBCDIC) character set. Clients, such as personal computers, work with code pages based on the user's locale, such as American Standard Code for Information Interchange (ASCII) data, so when doing an ftp put with the text mode, the conversion from the client codepage, such as ASCII, to server EBCDIC is performed by the FTP server, and vice-versa when doing an ftp get. Files such as source code are typically handled as text, so clients author and store the files as ASCII, z/OS as EBCDIC, and transfers are performed with text conversion taking place across the wire. The default code page to use for conversion is typically a configuration setting on the server, and can be overridden by each client prior to a text transfer taking place.

There are other files which contain text which need to be stored in binary on the server. An example of this is Extended Markup Language (XML) files which have a UTF-8 encoding and need to be processed by server side Java (Java is a trademark of Sun Microsystems, Inc.) programs which have been written to read UTF-8 text. An example used by the CICS (Customer Information Control System, CICS is a trademark of International Business Machines Corporation) transaction server is the cics.xml files that are part of a CICS bundle. These kinds of file need to be transferred between client and server in binary mode, so that no character conversion takes place and all characters remain in their raw bytes.

Known solutions to transfer files back and forth between client and server using the correct format may involve one or more of the following:

Having advance knowledge of the file type to be used based on the scenario in which it is being used;

Associating a file extension with a particular type (e.g. FileZilla, and most common ftp clients);

Letting the user specify which transfer type to use (e.g. Rational Developer for System z).

The disadvantages of these solutions are:

Advance knowledge of the file type based on the scenario does not work for a generic solution where the user wants to browse server files and select one to edit based on its path, rather than its usage.

Having to associate a file extension is not always sufficient as the same file extension can be text sometimes, and binary at other times. For example, cics.xml in a CICS bundle is binary, whereas atomservicedefinition.xml is text.

Letting the user specify which transfer type to use means that there is more room for error—the user can make a mistake and corrupt their data—and the user must have knowledge of file type and their usage, meaning the skill level required to use the client software is higher.

There may also arise situations in which the usage of servers has grown from one locale to multiple locales, such as when a business that was US English only has expanded to include customers with other languages and therefore non-ASCII codepage documents. A hybrid mix of documents may be found on a file system where older ones, or ones used by older systems, require storage in the original codepage, in this example ASCII, whereas documents which are stored by users in other locales are held in their respective code pages, and documents which must be accessed by users from more than one locale are stored in a neutral format such as UTF-8.

Therefore, there is a need in the art to address the aforementioned problems.

SUMMARY

In one illustrative embodiment, a method, in a data processing system, is provided for automatic determining of file transfer mode. The illustrative embodiment determines a locale or an operating system of a client in a file transfer. The illustrative embodiment downloads at least part of a transfer file in a first text format to obtain first resulting bytes. The illustrative embodiment analyzes the first resulting bytes to determine whether the first resulting bytes match a character set of the locale or the operating system of the client above a first predetermined threshold. The illustrative embodiment determines whether the first text format should be used for downloading the transfer file based on whether the first resulting bytes match the character set of the locale or the operating system of the client above the first predetermined threshold. The illustrative embodiment downloads the transfer file in the identified first text format in response to the first resulting bytes matching the character set of the locale or the operating system of the client above the first predetermined threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

Figure 1:
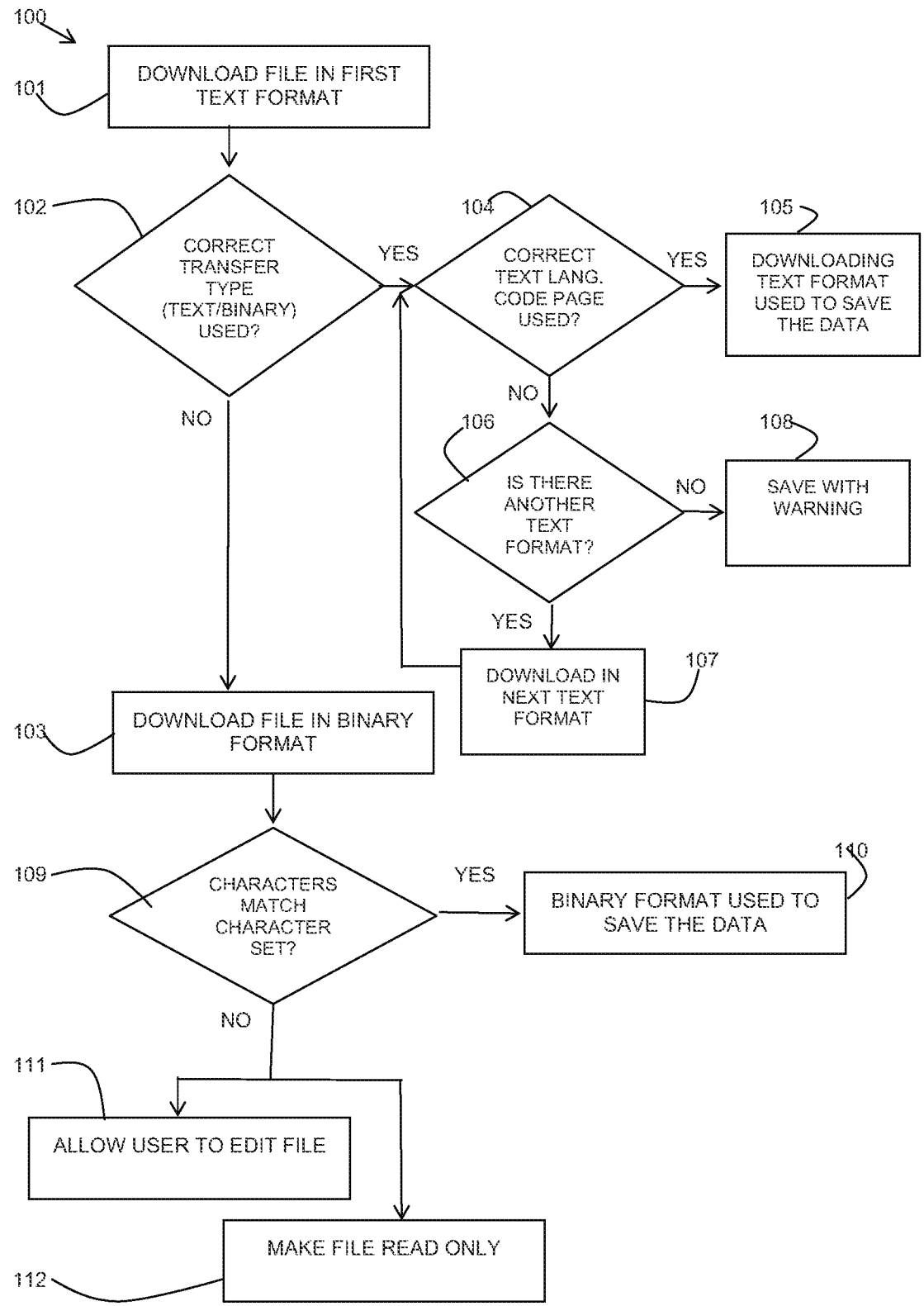
FIG. 1 is a flow diagram of a first embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method is described for automatic file transfer mode determining which downloads a file or a portion of a file as a first format of text or binary, and then looks at the resulting bytes to see whether they generally fall within or match a character set for the locale or an operating system of a client. A download may be carried out in a second format of the other of text or binary, either if the first download does not match within a threshold, or to determine which is the better match. If there are a substantial number of characters not in the character set of the client locate, the method may select to download the file in a binary format.

A locale of a client may be a set of parameters that defines a user's language, country, and any other variants required in the user interface. A locale has an associated character set, also referred to as a code page or character encoding which defines the characters used in the language of the locale.

A file for transfer may fall into three categories, text stored as text, text stored as binary, or binary stored as binary. Binary stored as binary may be the case for files such as picture formats such as .gif or .bmp. A text file may undergo a text conversion during transfer whereas a binary file (even including text) is transferred without alteration. Both downloaded text files and binary files may be compared to a text character set to determine if there are matches. If there are no matches, the file is most likely a binary file. Otherwise, the closest match may be selected. The character set used is of default as the character set of the locale of the client. Other character sets may also be tried, if the default does not match well.

For data which was entered as text by the user from the keyboard and then transferred to the host machine, one of these two downloads should substantially match the original character set.

For text formats, character sets of text including different language code pages may be used to determine if text format used for download is the correct language format. The correct text language code page may then be used.

The operating system may use the user's character set based on their locale as a default, for example, German code page if they are German or ASCII for US English. The character set used is for the client operating system, therefore, it will vary based on the locale of the operator, so text documents stored in the user's code page as text will be correctly retrieved as text in their own code page.

The character set of an operating system of the client refers to the set of characters which can typically be entered from the keyboard without the use of special input mechanisms. For example, a UK keyboard has a currency symbol for a pound symbol £ and a dollar $, a US keyboard does not have a £ symbol, a French keyboard has a ê symbol. When the character is displayed with the wrong locale instead of being a character that the user would typically have entered from the keyboard as part of a text document, it would appear as something else, such as ℥ or ╫ Because these are not available from the keyboard they are less likely to have been entered by the user naturally as part of a text document, and therefore indicate that an incorrect choice of transfer type or, for text documents, code page, was used. These character sets are also referred to as "printable characters" for an operating system.

The described method may be thought of as automating the manual step of the user opening the file with the wrong transfer type, seeing it in the editor as being unrecognizable as text they can understand, and then going back and specifying that they want to perform another download in the other transfer type. Having worked out the transfer type that the file was originally saved in, then the editor can re-use this thereby preserving the content type on the host machine. This is important where the file is input to a runtime on the host, and having it in the wrong format could cause unpredictable results. It is also important for solutions where a mixed set of documents are being stored on a single file server, such as where a business is operating in more than one region with different languages, and users in a single locale can store and retrieve documents preserving special characters such as currency symbols, umlauts, accents, and other non alphabetic text content.

The advantage over the existing solutions is that there is no manual step for the user to specify the file type and make a possible mistake or be slowed down. It does not rely on file extensions which are not good enough because they are not unique per content type and it works generically on all files irrespective of the scenario being used to open the file.

An example of this is where the CICS transaction server on z/OS stores text files in either UTF-8 (binary) such as event binding files, or in EBCDIC (text) such as atom configuration files. Both of these files can end with the .xml suffix so the file suffix technique wilt not work. In this case downloading the files in first text and then doing a character analysis and switching to binary, if not, ensures that the user of a client piece of software can just double click the file and work with it in text, before saving it back to z/OS in the correct format.

The described method works by doing a transfer of the file in either text or binary mode, and then looking at the bytes in the returned result to determine whether the characters contains any that are not printable by the default character set of the platform.

Referring to FIG. 1, a flow diagram 100 shows a first embodiment of the described method of automatic determining of file transfer mode.

In a first step, a file, or a portion of a file, may be downloaded 101 in a first text format. This first text format may be the text format of the locale of the client operating system. The locale of the client or the operating system may be determined and the default code page to use for conversion in the first text format provided as a configuration setting on the server.

The resultant bytes may be analysed and it may be determined 102 if the correct transfer type of text/binary format has been used. This may be done by determining if a substantial proportion of the downloaded characters fall within the character set of the first text format. A threshold may be set for this substantial proportion or for the number of characters falling outside the character set.

If it is determined 102 that the correct text/binary format has not been used, the file, or a portion of the file, may be downloaded 103 in a binary format.

If it is determined 102 that the correct text/binary format was used, it may then be determined 104 if the correct text language code page has been used. This may be done by determining if there are any characters not falling within the character set of the first text format, also referred to as unprintable characters.

If it is determined 104 that the correct text language code page has been used, the downloading text format may be used to save 105 the data.

If it is determined 104 that an incorrect text language code page has been used, it is then checked 106 whether there are other text formats available. If so, another text format is used to download 107 the file and the method loops to determine if the correct text language code page has now been used. If there are no further available text formats, the file may be saved 108 in one of the text formats and a warning displayed to the client that the downloaded file may contain missing characters.

If a file is downloaded in binary format 103, it may be determined 109 if the resultant characters match a text character set. If a match of character set is made, the file may be saved 110 in the binary format. The character set used may be for the locale of the client.

If the character set match is above a predefined threshold but still includes unprintable characters, other text character sets may be tried to determine if there is a better match.

If a match of character set is not made, the process may then make a choice as to whether to allow 111 the user to continue to edit the file—to drop into a raw mode where hex values could be entered—or to make file read only 112 to prevent any data corruption occurring. If a match of character set is not made, the file may be a picture or other form of non-character based file which should still be downloaded in a binary format.

If characters are found in a downloaded file, which do not match a character set of the downloaded format, then this might indicate that the transfer type was incorrect. For example, if the data was originally stored as text and retrieved as binary, most or all of the characters will fall outside of the printable range when retrieved. It might also indicate that the transfer type is correct, but that the code page used was incorrect. For example, if the document was stored as text with UK English and retrieved as US English, then the currency symbol may be outside the set of US characters.

In the case where most or all of the characters fall outside of the printable range and the document is expected to have contained text, this would indicate the wrong transfer type was used. In the case where one or a few characters fall outside of the printable range, this would indicate that the wrong code page was used and the errors were special symbols such as accented letters, currency symbols, or other specialized locale specific symbols.

When comparing the bytes of the downloaded data to determine whether the contents have been retrieved correctly, a match may be made in terms of the correct file format, from either text or binary, and for text a match may be made in terms of the correct code page. In an example default implementation, the character set of the user's locale may be used to perform the text transfer, with the presumption that the user has written the document in their language using any special characters and symbols from their language locale and is retrieving the document. If the transfer indicates that a few characters are outside the printable range, then it is possible that the document transfer type of text is correct, but the locale is incorrect. In this case, the process might be made aware that the file system contains a hybrid set of documents in different locals, as could occur if the organization using the file system was a multinational in several different regions. A second attempt to perform a download, in this case as text but using one of the other possible locales may be used, until the correct locale was found which would occur when there were no unprintable characters.

The trigger for whether a document downloaded in text is using an incorrect code page, or the wrong transfer type, described above as an error of a few characters being outside the printable range, would be a threshold configurable by the user, which might typically be a number in the range of 5% or fewer.

If the resulting bytes fall within a set of characters for an operating system of the client, then the downloaded file may be displayed and the downloading format may be used to save the data. This solves the problem of users downloading a file in one type and storing it in another which can corrupt data, especially if the file is part of a computing system that expects it to be in a particular format. The described method preserves the format used to originally store the document by using character set analysis to determine what that was, and then it preserves that on update. If the user wanted to store the document in a different file format or, for text documents, code page, then that would have to be an explicit action by the user as the usage of the file has now been altered.

The method described increases the chance of the bytes being text if they were intended to be text. Some data, such as pictures, for example, in .gif or .bmp or other formats is not text so will fail to be valid printable characters, in which case by having the binary be the second download step in the logic above, binary files are ensured to always be binary. When doing the download, looking for success/failure based on whether it contains characters or not, and then correcting with subsequent download(s), the described method in the first embodiment of FIG. 1 does the download first in text and then binary. The reason is because the file could fall into three categories, text stored as text, text stored as binary, or binary stored as binary. Binary stored as binary would be the case for files such as picture formats such as .gif or .bmp. This method ensures that it correctly downloads text files as text, so the first transfer is in text. For a file such as a picture which is intended to be binary it will look incorrect as it contains no printable characters, and is then downloaded as binary. It will still look unprintable as binary, which indicates it is binary. This ensures that binary content is not incorrectly downloaded as text, as the choice for unprintable characters is that it is binary content.

The following is an example of some Java code to implement the described method in which the first format is text format and the second format is binary format:

```
// Get the data in text format
byte[ ] bytearray = getBytes(Transfer.Text);
//defaultCharset returns the charset of the OS
CharsetDecoder d = Charset.defaultCharset( ).newDecoder( );
try {
    CharBuffer r = d.decode(ByteBuffer.wrap(bytearray));
```

```
// If we get here then the bytearray didn't throw any exceptions to the trans-
fer
was correct
} catch (CharacterCodingException e) {
    // Get the data in binary
    bytearray = getBytes(Transfer.Binary);
}
// Now bytearray contains valid text to display
```

Figure 2:
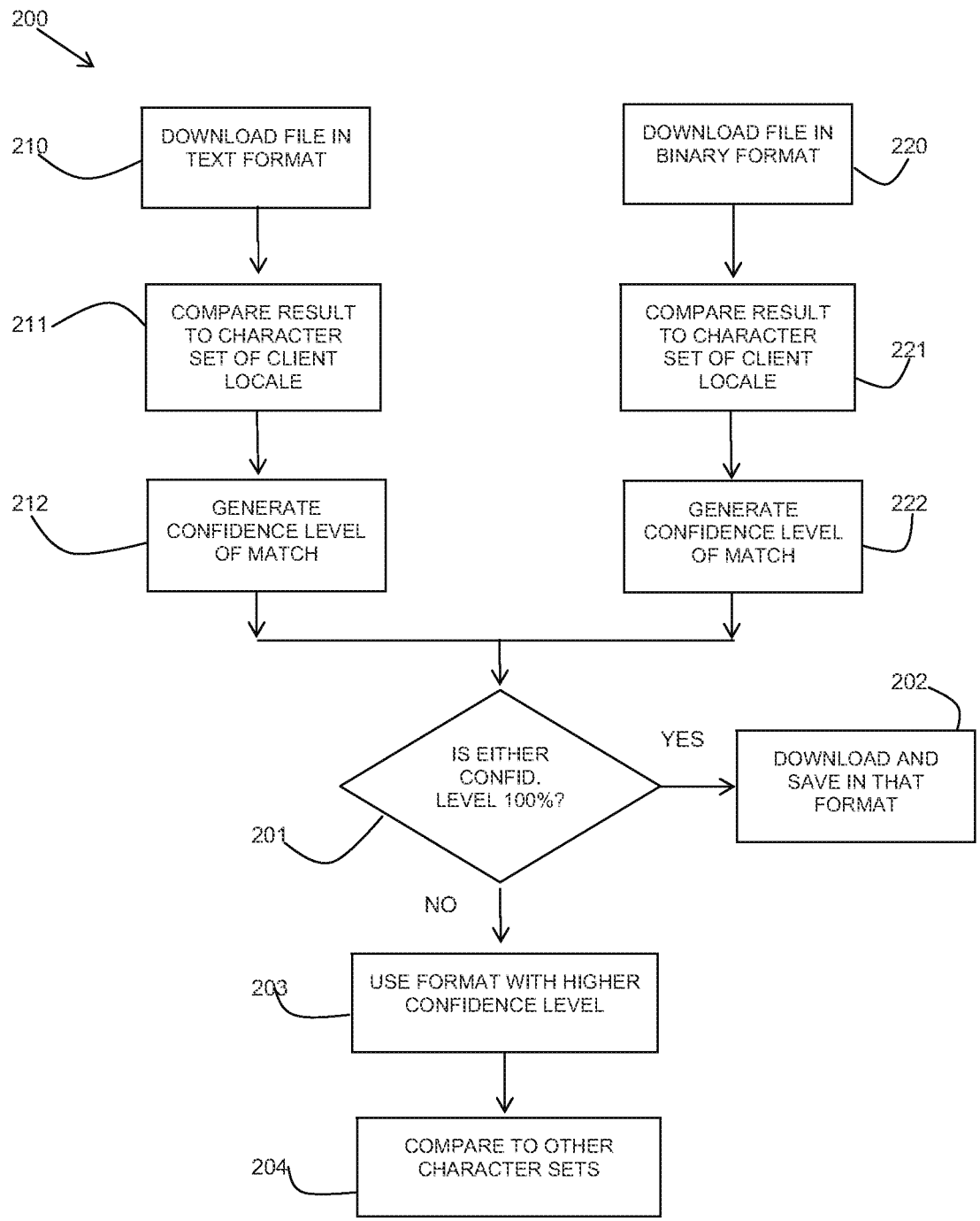
FIG. 2 is a flow diagram of a second embodiment of a method in accordance with the present invention.

Referring to FIG. 2, a flow diagram 200 shows a second embodiment of the described method of automatic determining of file transfer mode. In this embodiment, the file or part of the file may be downloaded in text and binary, either in parallel or consecutively.

A file, or part of a file, may be downloaded 210 in a text format and the file, or part of the file, may also be downloaded 220 in binary format. In both cases, the resultant bytes may be compared 211, 221 to a character set for the client's locale. In both cases, a confidence level may be generated 212, 222 of the match to the character set.

It may be determined 201 if either confidence level is 100%, in which case this file format is used 202 for downloading and saving the file. If neither confidence level is 100%, then the format with the highest confidence level may be used 203. If there are bad characters in the downloaded file, the downloaded file may be compared 204 to one or more other character sets character set, in the case of a text format having the highest confidence level, other text formats for downloading may be tried.

Figure 3:
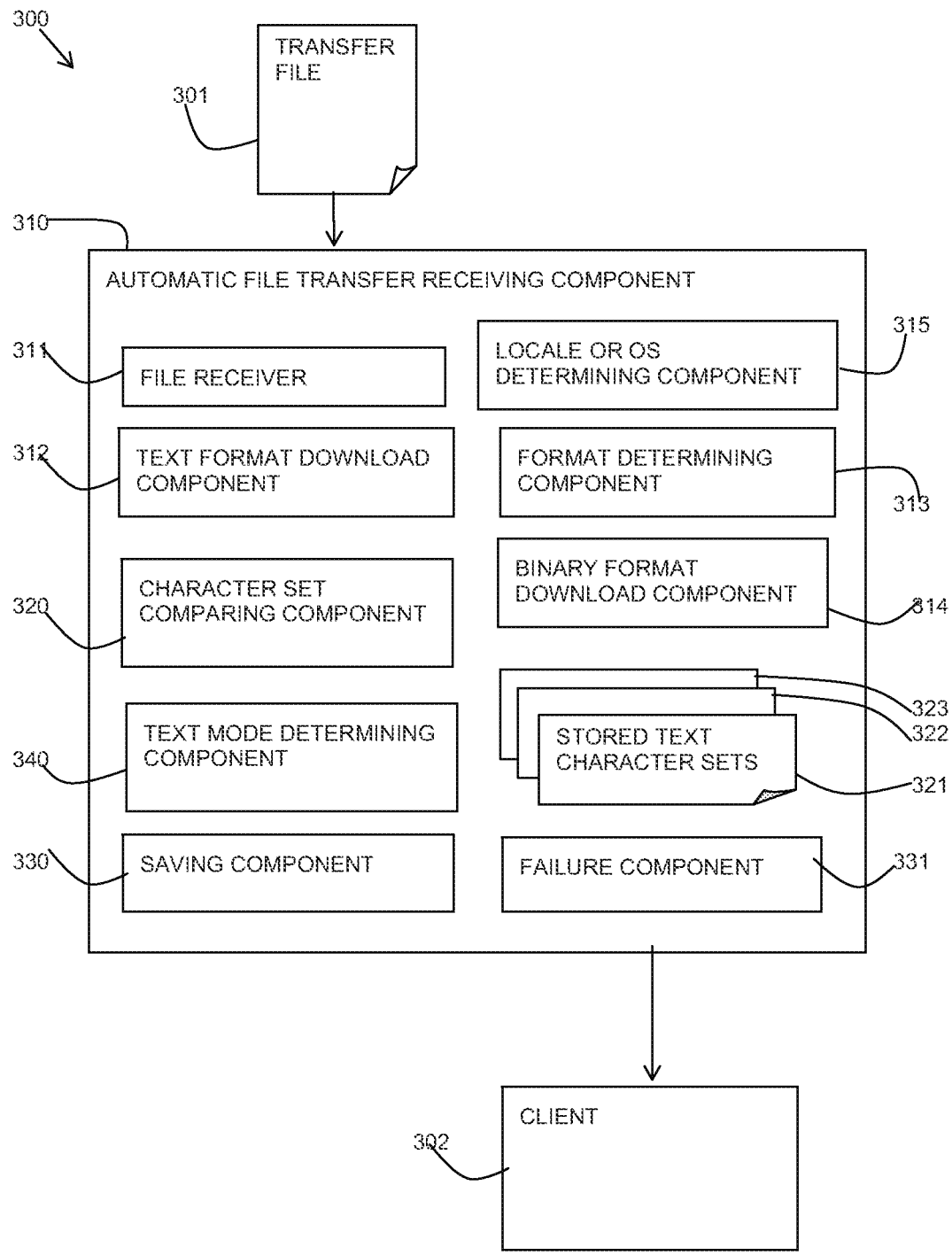
FIG. 3 is a block diagram of a system in accordance with the present invention.

Referring to FIG. 3, a block diagram 300 shows an example embodiment of an automatic file transfer mode determining system.

An automatic file transfer receiving component 310 is provided for receiving a transfer file 301 for transfer between a client 302 and a server using FTP. The automatic file transfer receiving component 310 may be provided at the client 302 or as a remote service to the client.

The automatic file transfer receiving component 310 may include a file receiver 311 for receiving a file 301 to be downloaded. A locale or operating system determining component 315 may be provided for determining the locale or operating system of the client 302 in the file transfer.

A text format download component 312 may be provided for downloading a received file, or part of a file, in a text format. A binary format download component 314 may also be provided for download a received file, or part of a file, in binary format. A format determining component 313 may be provided for determining if a downloading format is correct for a file. The format determining component 313 may use a threshold of character matches in the downloaded file with a stored character set 321 for a default text format. In another embodiment, the format determining component 313 may compare a confidence level of matches to the character set from downloading in two different formats, i.e. text and binary formats, to determine which format is to be used.

A character set comparing component 320 may be provided to compare the resulting bytes of a downloaded file by the text format download component 312 and the binary format download component 314 with one or more stored text character sets 321-323 to determine a correct text format. Once the correct text format is determined, text mode determining component 340 determines if the correct text language code page has been used. This may be done by determining if there are any characters not filling within the character set of the first text format, also referred to as unprintable characters. Text mode determining component 340 downloads the file in a second text format with the text character set in the form of a code page for a second text language, if a substantial proportion of the resulting bytes match the text character set, but some characters do not match. The one or more stored character sets may include as a default the text character set 321 of an operating system of the locale of the client 302. Other stored text character sets 322, 323 may include other text language character sets for other locales, in particular if the client 302 is part of an organisation with other locales.

A saving component 330 may be provided to save a downloaded file at the client 303 in a format of the successful download. A failure component 331 may be provided to indicate if a download format does not match stored character sets and to provide other options to a user.

Figure 4:
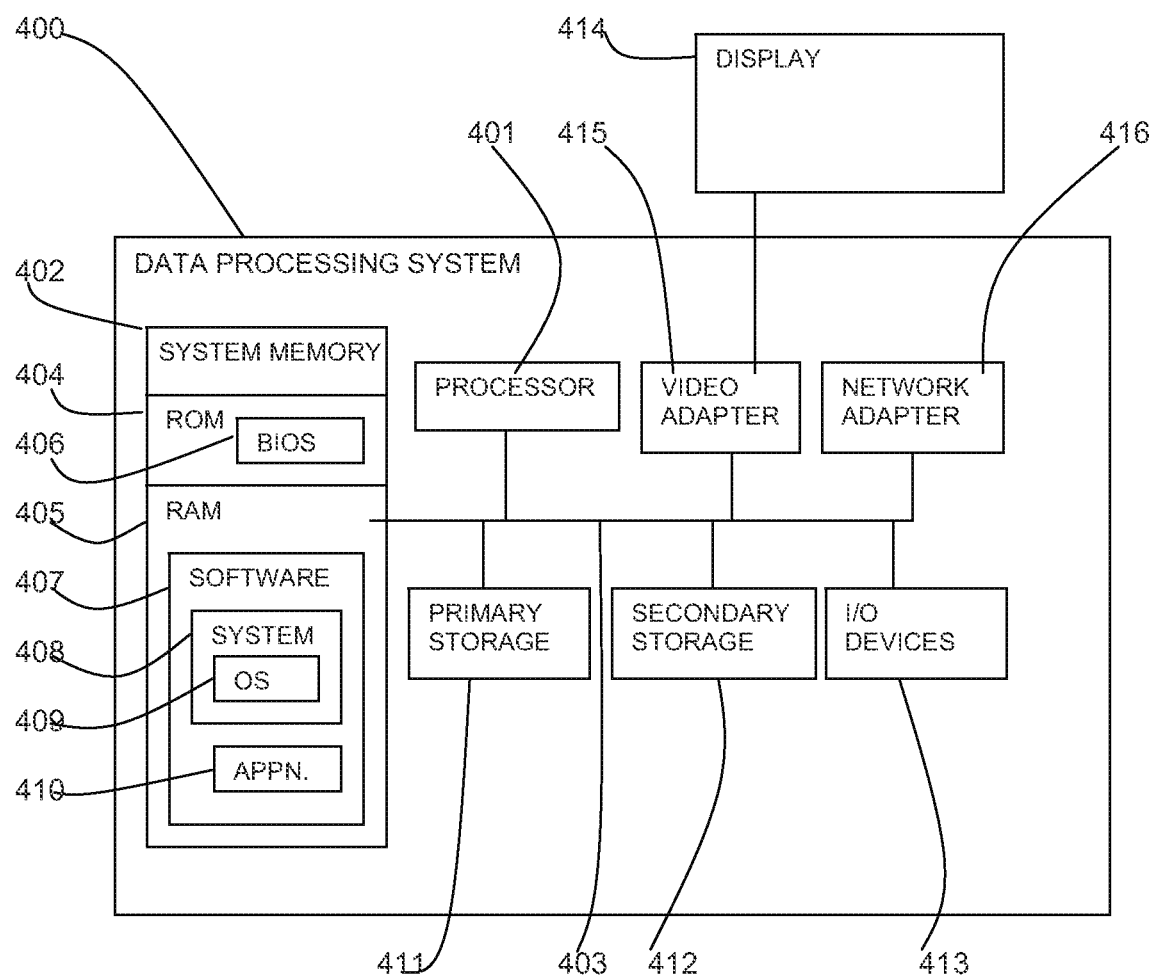
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, hulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including system software 408, including operating system software 409. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The described solution allows a user to navigate to a file and select it for transfer. The software determines the transfer to do automatically with no user intervention required, and it saves the data back in the correct format. This lowers the skill level required, leads to fewer mistakes, and improves general usability.

An automatic file transfer mode determining system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for automatic determining of file transfer mode, comprising:
   determining a locale or an operating system of a client in a file transfer;
   downloading at least part of a transfer file in a first text format to obtain first resulting bytes;
   analyzing the first resulting bytes to determine whether the first resulting bytes match a character set of the locale or the operating system of the client above a first predetermined threshold;
   determining whether the first text format should be used for downloading the transfer file based on whether the first resulting bytes match the character set of the locale or the operating system of the client above the first predetermined threshold;
   responsive to the first resulting bytes matching the character set of the locale or the operating system of the client above the first predetermined threshold and determining that there are no characters of the at least part of the transfer file that do not fall within the character set of the first text format, downloading the transfer file in the first text format and saving the transfer file in the first text format;
   responsive to the first resulting bytes matching the character set of the locale or the operating system of the client above the first predetermined threshold but determining that there are characters of the at least part of the transfer file not falling within the character set of the first text format, downloading the transfer file in a second text format with a text character set in a form of a code page for a second text language and saving the transfer file in the second text format;
   responsive to the first resulting bytes failing to match the character set of the locale or the operating system of the client above the first predetermined threshold, downloading the at least part of the transfer file in a binary format to obtain second resulting bytes;
   analyzing the second resulting bytes to determine whether the second resulting bytes match the character set of the locale or the operating system of the client above a second predetermined threshold;
   determining whether the binary format should be used for downloading the transfer file based on whether the second resulting bytes match the character set of the locale or the operating system of the client above the second predetermined threshold;
   responsive to the second resulting bytes matching the character set of the locale or the operating system of the client above the second predetermined threshold, downloading the transfer file in its entirety in the binary format; and
   saving the transfer file in the binary format.

2. The method as claimed in claim 1, wherein the first text format is a first text language format of the locale or the operating system of the client and the character set is a code page for the first text language format.

3. The method as claimed in claim 1, further comprising:
   responsive to the second resulting bytes failing to match the character set of the locale or the operating system of the client above the second predetermined threshold, allowing a user to edit the transfer file.

4. The method as claimed in claim 1, further comprising:
   responsive to the second resulting bytes failing to match the character set of the locale or the operating system of the client above the second predetermined threshold, making the transfer file read only.

5. The method as claimed in claim 1, including:
   downloading the at least part of a transfer file in both the first text format to obtain the first resulting bytes and a binary format to obtain second resulting bytes;
   determining a first confidence level of matches of the first resulting bytes to the character set;
   determining a second confidence level of matches of the second resulting bytes to the character set
   responsive to the first confidence level being greater than the second confidence level, using the first text format to download the transfer file; and
   responsive to the second confidence level being greater than the first confidence level, using the binary format to download the transfer file.

6. A system for automatic determining of file transfer mode, comprising:
   a processor; and
   a memory coupled to the processor, wherein the memory comprises instructions which, when executed by the processor, cause the processor to:
   determine a locale or an operating system of a client in a file transfer;
   download at least a part of a transfer file in a first text file format to obtain first resulting bytes;
   analyze the first resulting bytes to determine whether the first resulting bytes match a character set of the locale or the operating system of the client above a first predetermined threshold;
   determine whether the first text format should be used for downloading the transfer file based on whether the first resulting bytes match the character set of the locale or the operating system of the client above the first predetermined threshold;
   responsive to the first resulting bytes matching the character set of the locale or the operating system of the client above the first predetermined threshold and determining that there are no characters of the at least part of the transfer file that do not fall within the character set of the first text format, download the transfer file in the first text format and save the transfer file in the first text format;
   responsive to the first resulting bytes matching the character set of the locale or the operating system of the client above the first predetermined threshold but determining that there are characters of the at least part of the transfer file not falling within the character set of the first text format, download the transfer file in a second text format with a text character set in a form of a code page for a second text language and save the transfer file in the second text format;

responsive to the first resulting bytes failing to match the character set of the locale or the operating system of the client above the first predetermined threshold, download the at least part of the transfer file in a binary format to obtain second resulting bytes;

analyze the second resulting bytes to determine whether the second resulting bytes match the character set of the locale or the operating system of the client above a second predetermined threshold;

determine whether the binary format should be used for downloading the transfer file based on whether the second resulting bytes match the character set of the locale or the operating system of the client above the second predetermined threshold;

responsive to the second resulting bytes matching the character set of the locale or the operating system of the client above the second predetermined threshold, download the transfer file in its entirety in the binary format; and save the transfer file in the binary format.

7. The system as claimed in claim 6, wherein the first text format is a first text language format of the locale or the operating system of the client and the character set is a code page for the first text language format.

8. A computer program product comprising a non-transitory computer readable medium having a computer readable program stored therein, wherein the computer readable program, when loaded into an internal memory of a computing device and executed on the computing device, causes the computing device to:

determine a locale or an operating system of a client in a file transfer;

download at least a part of a transfer file in a first text file format to obtain first resulting bytes;

analyze the first resulting bytes to determine whether the first resulting bytes match a character set of the locale or the operating system of the client above a first predetermined threshold;

determine whether the first text format should be used for downloading the transfer file based on whether the first resulting bytes match the character set of the locale or the operating system of the client above the first predetermined threshold;

responsive to the first resulting bytes matching the character set of the locale or the operating system of the client above the first predetermined threshold and determining that there are no characters of the at least part of the transfer file that do not fall within the character set of the first text format, download the transfer file in the first text format and save the transfer file in the first text format;

responsive to the first resulting bytes matching the character set of the locale or the operating system of the client above the first predetermined threshold but determining that there are characters of the at least part of the transfer file not falling within the character set of the first text format, download the transfer file in a second text format with a text character set in a form of a code page for a second text language and save the transfer file in the second text format;

responsive to the first resulting bytes failing to match the character set of the locale or the operating system of the client above the first predetermined threshold, download the at least part of the transfer file in a binary format to obtain second resulting bytes;

analyze the second resulting bytes to determine whether the second resulting bytes match the character set of the locale or the operating system of the client above a second predetermined threshold;

determine whether the binary format should be used for downloading the transfer file based on whether the second resulting bytes match the character set of the locale or the operating system of the client above the second predetermined threshold;

responsive to the second resulting bytes matching the character set of the locale or the operating system of the client above the second predetermined threshold, download the transfer file in its entirety in the binary format; and save the transfer file in the binary format.

9. The computer program product as claimed in claim 8, wherein the first text format is a first text language format of the locale or the operating system of the client and the character set is a code page for the first text language format.

10. The computer program product as claimed in claim 8, wherein the computer readable program further causes the processor to:

responsive to the second resulting bytes failing to match the character set of the locale or the operating system of the client above the second predetermined threshold, allow a user to edit the transfer file.

11. The computer program product as claimed in claim 8, wherein the computer readable program further causes the processor to:

responsive to the second resulting bytes failing to match the character set of the locale or the operating system of the client above the second predetermined threshold, making the transfer file read only.

12. The system as claimed in claim 6, wherein the instructions further cause the processor to:

responsive to the second resulting bytes failing to match the character set of the locale or the operating system of the client above the second predetermined threshold, allow a user to edit the transfer file.

13. The system as claimed in claim 6, wherein the instructions further cause the processor to:

responsive to the second resulting bytes failing to match the character set of the locale or the operating system of the client above the second predetermined threshold, making the transfer file read only.

14. The system as claimed in claim 6, wherein the instructions further cause the processor to:

download the at least part of a transfer file in both the first text format to obtain the first resulting bytes and a binary format to obtain second resulting bytes;

determine a first confidence level of matches of the first resulting bytes to the character set;

determine a second confidence level of matches of the second resulting bytes to the character set responsive to the first confidence level being greater than the second confidence level, use the first text format to download the transfer file; and responsive to the second confidence level being greater than the first confidence level, use the binary format to download the transfer file.

15. The computer program product as claimed in claim 8, wherein the computer readable program further causes the processor to:

download the at least part of a transfer file in both the first text format to obtain the first resulting bytes and a binary format to obtain second resulting bytes;

determine a first confidence level of matches of the first resulting bytes to the character set;

determine a second confidence level of matches of the second resulting bytes to the character set responsive to the first confidence level being greater than the second confidence level, use the first text format to download the transfer file; and responsive to the second confidence level being greater than the first confidence level, use the binary format to download the transfer file.

\* \* \* \* \*